United States Patent
Pillers, II

(10) Patent No.: US 8,141,655 B2
(45) Date of Patent: Mar. 27, 2012

(54) HAMMER HAVING A TWO PART BODY

(75) Inventor: Lauritz P. Pillers, II, Waco, TX (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/470,402

(22) Filed: May 21, 2009

(65) Prior Publication Data

US 2009/0229844 A1 Sep. 17, 2009

Related U.S. Application Data

(63) Continuation of application No. 11/452,324, filed on Jun. 14, 2006, now abandoned.

(30) Foreign Application Priority Data

Jun. 15, 2005 (EP) ..................................... 05253698

(51) Int. Cl.
*B25D 17/08* (2006.01)
*B25D 9/04* (2006.01)
*B25F 5/02* (2006.01)

(52) U.S. Cl. ........................... 173/206; 173/90; 173/171

(58) Field of Classification Search ........ 173/131–133, 173/128–129; 279/19–19.7
See application file for complete search history.

(56) References Cited

U.S. PATENT DOCUMENTS

| | | | |
|---|---|---|---|
| 1,331,353 A | 2/1920 | Nurnberger | |
| 1,699,870 A | 1/1929 | Black et al. | |
| 1,866,863 A | 5/1929 | Richardson | |
| 1,865,637 A | 7/1932 | Lear | |
| 2,220,195 A | 11/1940 | Amundsen | |
| 2,231,496 A | 2/1941 | Fuehrer | |
| 2,236,122 A | 3/1941 | Tuttle | |
| 2,237,875 A | 4/1941 | Brown | |
| 2,430,422 A * | 11/1947 | Happe | ........................... 173/170 |
| 2,837,341 A | 6/1958 | Swanson | |

(Continued)

FOREIGN PATENT DOCUMENTS

DE 613109 5/1935

(Continued)

OTHER PUBLICATIONS

Pillers, II, U.S. Appl. No. 11/452,324, filed Jun. 14, 2006, "Tool Assembly Having a Two Part Body" (19 pages).

(Continued)

*Primary Examiner* — Lindsay Low
(74) *Attorney, Agent, or Firm* — Finnegan, Henderson, Farabow, Garrett & Dunner LLP

(57) ABSTRACT

A tool assembly such as a hammer assembly, includes a housing defining a chamber and a reciprocating piston arranged in the chamber for cyclical movement in a work stroke and a return stroke. The housing includes a lower housing member, an upper housing member and an engaging structure which permits the engagement of the upper housing member with the lower housing member by relative rotation of the upper and lower housing members, such that each of the lower and upper housing members defines a portion of the chamber. The upper housing member is a precision component which contains the hydraulic components or other drive components necessary to drive the piston, while the lower housing member can be manufactured separately since it does not need to be manufactured to the high tolerances required by the upper housing member. The resulting tool assembly may be more compact than a conventional tie rod tool assembly.

20 Claims, 5 Drawing Sheets

U.S. PATENT DOCUMENTS

| | | |
|---|---|---|
| 3,003,773 A | 10/1961 | Fuehrer |
| 3,458,210 A | 7/1969 | Whitehouse |
| 3,724,237 A | 4/1973 | Wood |
| 3,730,281 A | 5/1973 | Wood |
| 3,972,376 A | 8/1976 | Price |
| 4,491,445 A | 1/1985 | Hunger et al. |
| 4,545,440 A | 10/1985 | Treadway |
| 4,573,839 A | 3/1986 | Finnegan |
| 4,632,195 A | 12/1986 | Emmerich |
| 5,125,462 A | 6/1992 | Hesse |
| 5,211,693 A | 5/1993 | Pacher |
| 5,320,187 A | 6/1994 | Pressley et al. |
| 5,350,025 A | 9/1994 | Campbell et al. |
| 5,401,066 A | 3/1995 | Remsburg |
| 5,522,606 A | 6/1996 | Pressley et al. |
| 5,586,607 A * | 12/1996 | Neumaier et al. ............ 173/117 |
| 5,667,228 A | 9/1997 | Fabris |
| 5,896,934 A | 4/1999 | Yaniero et al. |
| 5,944,120 A | 8/1999 | Barden |
| 5,971,403 A | 10/1999 | Yahagi et al. |
| 6,033,168 A | 3/2000 | Creely et al. |
| 6,056,070 A | 5/2000 | Shinohara et al. |
| 6,092,814 A | 7/2000 | Kageler |
| 6,328,116 B1 | 12/2001 | Hurskainen et al. |
| 6,491,111 B1 | 12/2002 | Livingston et al. |
| 6,497,418 B2 | 12/2002 | Yahagi |
| 6,510,904 B1 | 1/2003 | Tyrrell |
| 6,543,204 B2 | 4/2003 | Gruson |
| 6,543,789 B2 | 4/2003 | Frenzel et al. |
| 2006/0283612 A1 | 12/2006 | Pillars |
| 2006/0283615 A1 | 12/2006 | Pillars et al. |

FOREIGN PATENT DOCUMENTS

| | | |
|---|---|---|
| DE | 2244769 | 3/1974 |
| DE | 3809527 | 10/1988 |
| FR | 981770 | 5/1951 |
| FR | 1447933 | 6/1966 |
| GB | 332342 | 7/1930 |
| GB | 344689 | 3/1931 |
| GB | 713196 | 8/1954 |
| GB | 810464 | 3/1959 |
| GB | 2228703 | 9/1990 |

OTHER PUBLICATIONS

Pillers, II, U.S. Appl. No. 11/452,377, filed Jun. 14, 2006, "Shock Absorber for a Reciprocating Tool Assembly" (19 pages).

* cited by examiner

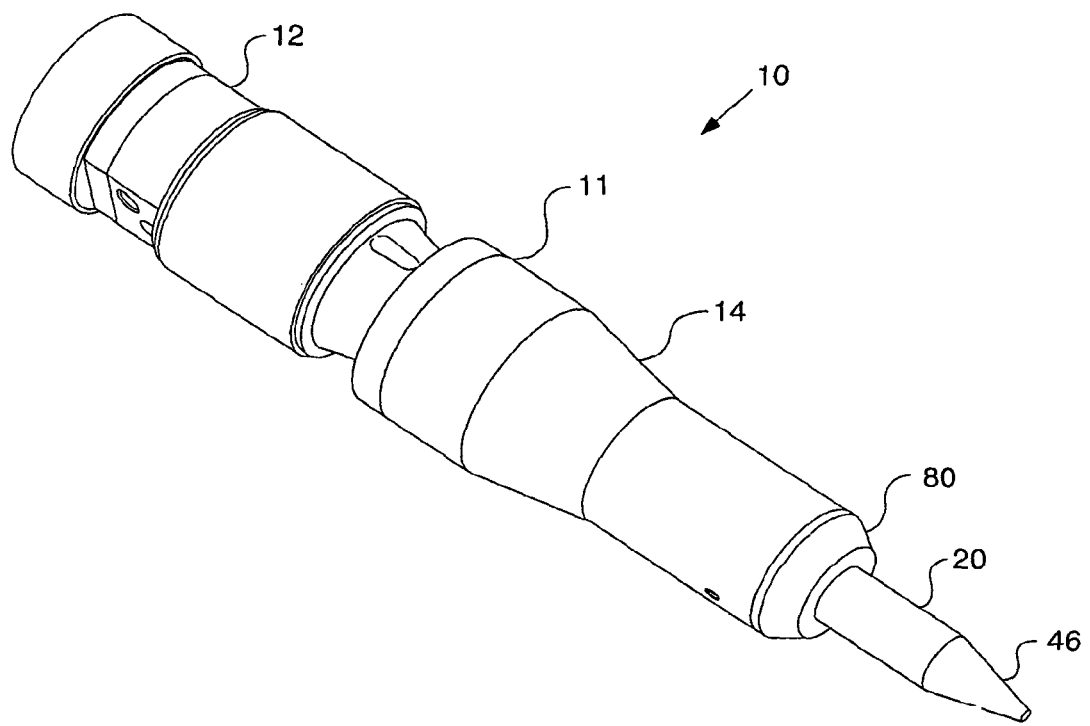

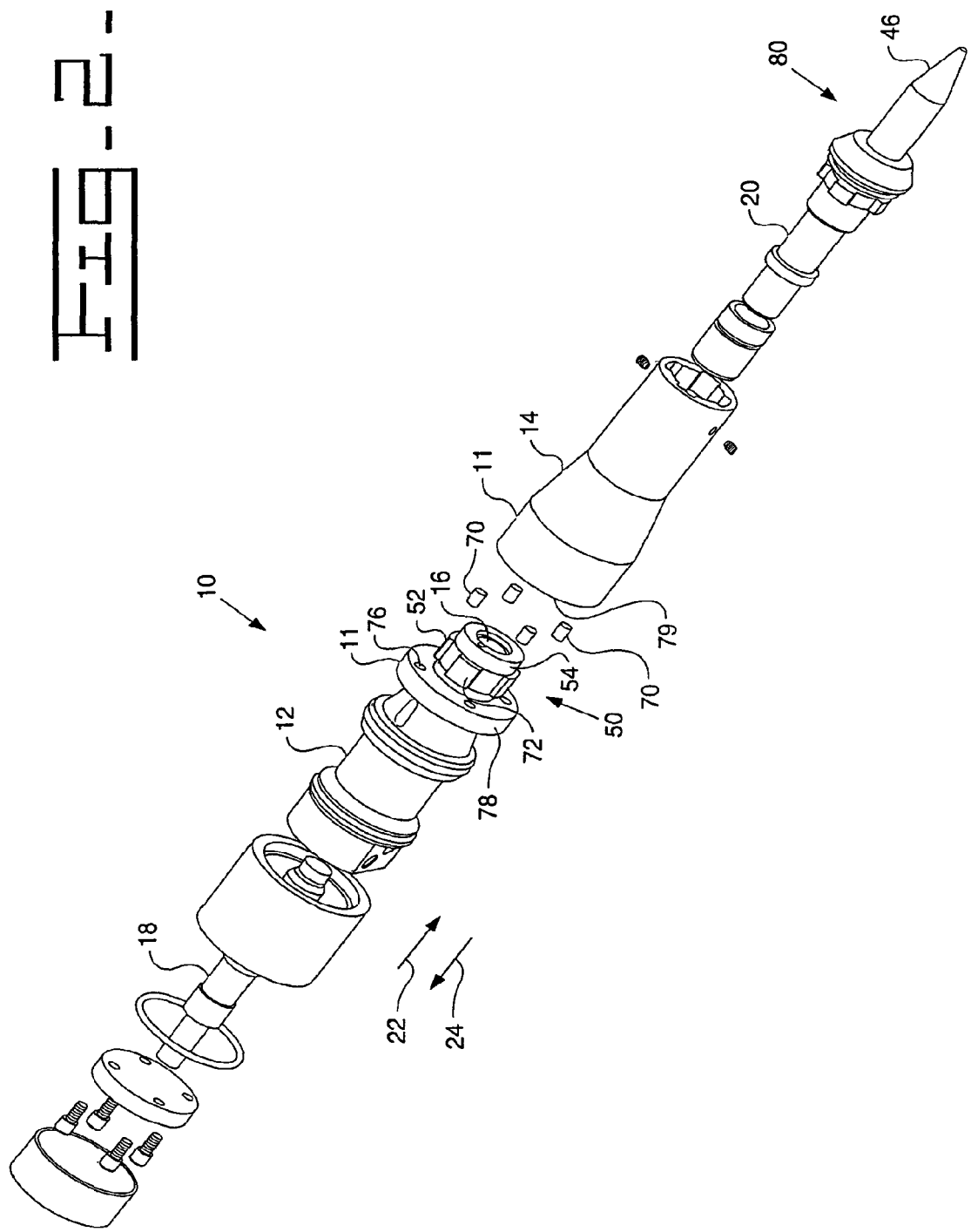

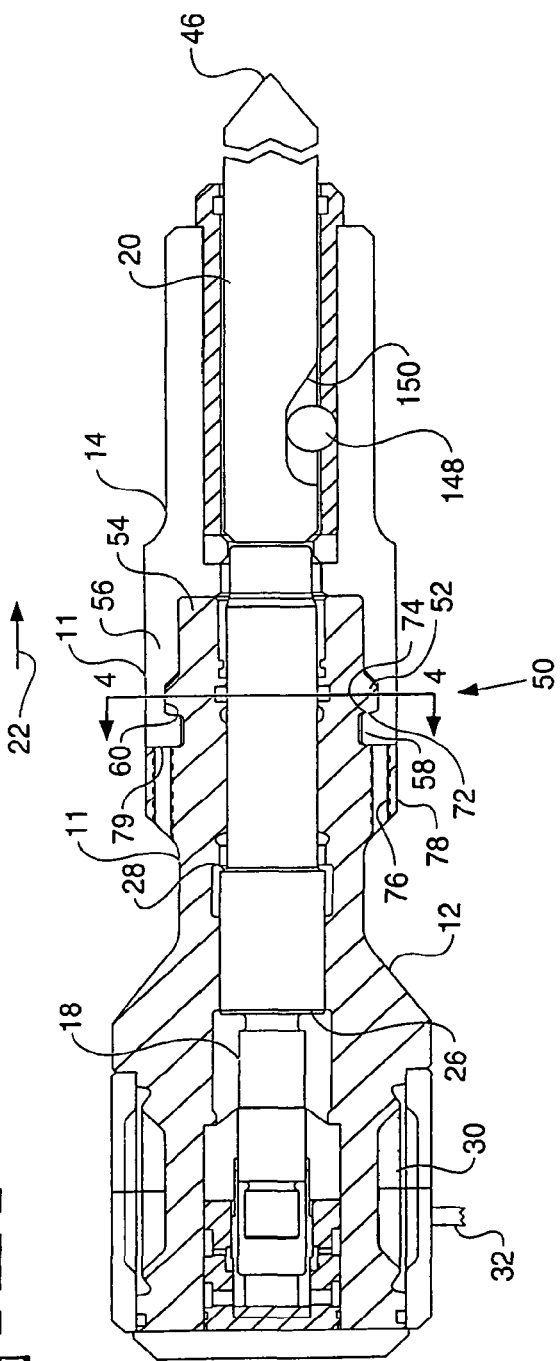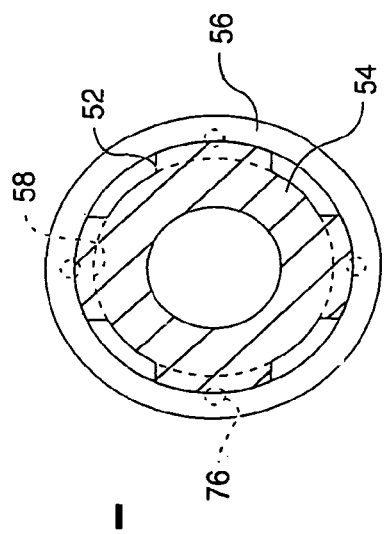

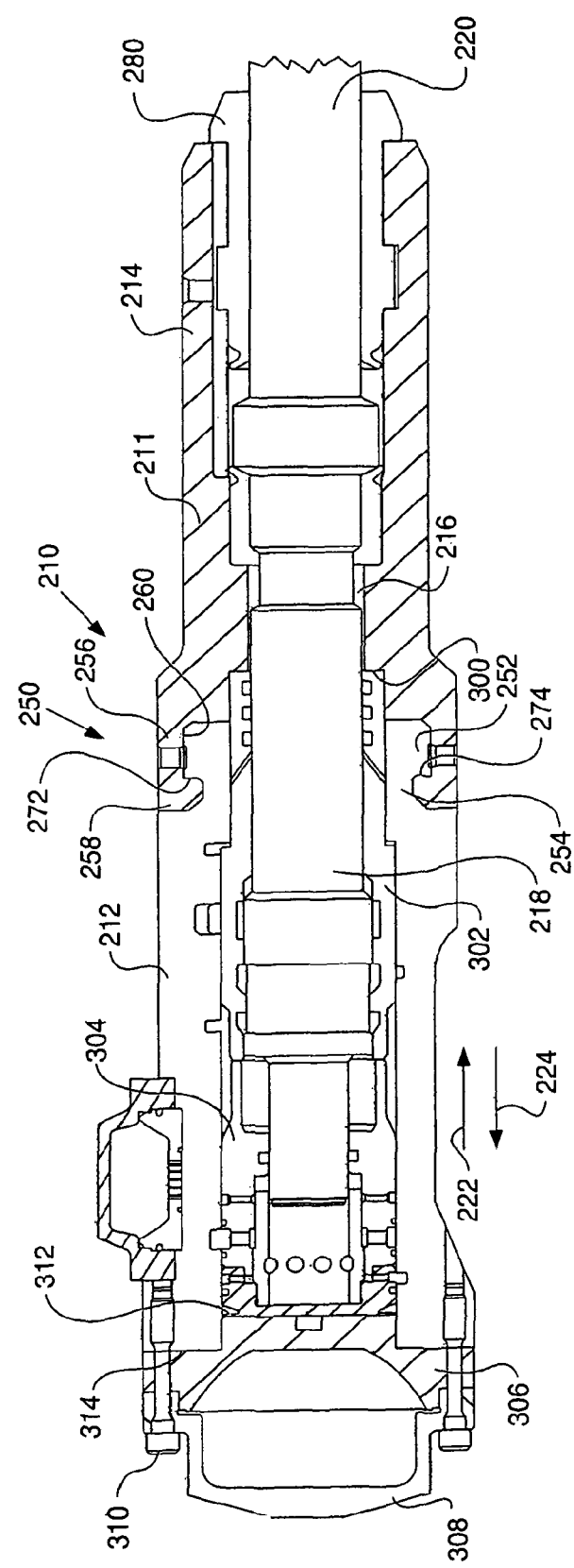

HAMMER HAVING A TWO PART BODY

This application is a continuation of U.S. patent application Ser. No. 11/452,324 filed Jun. 14, 2006.

TECHNICAL FIELD

The present disclosure relates generally to a tool assembly, and more specifically to a hammer assembly having a two part body comprising an upper housing member and a lower housing member.

BACKGROUND

Hydraulic hammers are used on work sites to break up large hard objects before such objects can be moved away. Hydraulic hammers may be mounted to back hoes or excavators, or may be hand-held. Typically, the hammer assembly is powered by either a hydraulic or pneumatic pressure source. During a work or power stroke, high fluid pressure is applied to a first shoulder of a piston, thereby driving the piston in a forward direction. The piston then strikes a work tool, which is driven in the forward direction thereby causing a work tip of the tool to strike the rock, concrete, asphalt or other hard object to be broken up. During a return stroke, fluid pressure is applied to a second shoulder of the piston in order to return the piston to its original position.

The work tool, also known as a tool bit, is retained within a sleeve, commonly referred to as a front head. When the tool is driven forward, the kinetic energy of the tool is transferred to the object to be broken up. However, if full contact with the object to be broken up does not occur, a proportion of the energy is transferred to the front head. If no contact takes place with the object to be broken up, then all of the energy may be transferred to the front head. Consequently, the front head is subject to cyclical loading which tends to pull it away from the cylinder of the hammer assembly. Conventionally, external tie rods are used to tie the front head to the cylinder. The tie rods increase the overall diameter of the hammer assembly and add to the complexity of manufacture. Tie rods typically have to be replaced at regular service intervals, since they are subject to fatigue failure and failure of a tie rod can cause irreparable damage to the entire hammer assembly.

SUMMARY OF THE INVENTION

A method may comprise attaching an upper housing member to a lower housing member to form a housing, the housing including a chamber extending between the upper housing member and the lower housing member, the upper housing member having a first pressure source of pressurized hydraulic fluid or pressurized air, positioning a piston inside the chamber for reciprocal movement therein, the piston including at least a first surface which communicates with the first pressure source to move the piston in a first direction, positioning a reciprocating work tool at least partially inside of the chamber, an upper part of the work tool being struck by the piston as the piston moves in the first direction inside the chamber to transfer force from the piston to a tip of the work tool, the tip being formed opposite the upper part and residing outside of the chamber, the upper part of the work tool being housed inside the lower housing member, removably attaching a tool retention member to the lower housing member, wherein when the tool retention member is attached to the lower housing member the tool retention member blocks removal of the work tool from the chamber and detachment of the work tool from the lower housing member, and when the tool retention member is removed from the lower housing member, the work tool may be removed from the chamber and detached from the lower housing member for replacement, and attaching the upper housing member to the lower housing member further comprises engaging a socket portion formed on one of the upper housing member or the lower housing member with a plug portion formed on the other of the upper housing member or the lower housing member, by inserting a plurality of outwardly projecting lugs formed on the plug portion into the socket and between a plurality of inwardly projecting projections formed on the socket portion, then rotating the lugs relative to the projections to engage the lugs beneath the projections and prevent removal of the plug portion from the socket portion.

A hammer may comprise a housing including an upper housing member and a lower housing member, the housing defining a chamber, the upper housing member having a first pressure source of pressurized hydraulic fluid or pressurized air, a piston reciprocating inside the chamber, the piston including at least a first surface which communicates with the first pressure source to move the piston in a first direction, a reciprocating work tool residing at least partially inside of the chamber, an upper part of the work tool being struck by the piston as the piston moves in the first direction inside the chamber to transfer force from the piston to a tip of the work tool, the tip being formed opposite the upper part and residing outside of the chamber, the upper part of the work tool being housed inside the lower housing member, a tool retention member removably attached to the lower housing member, wherein when the tool retention member is attached to the lower housing member the work tool cannot be removed from the chamber and when the tool retention member is removed from the lower housing member, the work tool may be removed from the chamber for replacement, and a socket portion formed on one of the upper housing member or the lower housing member, a plug portion formed on the other of the upper housing member or the lower housing member, the plug portion positioned in the socket portion, a plurality of outwardly projecting lugs formed on the plug portion and a plurality of inwardly projecting projections formed on the socket portion, the lugs being passable between the projections when the upper housing member is attached to the lower housing portion by inserting the plug portion into the socket portion, then rotatable relative to the projections to engage the lugs beneath the projections and prevent removal of the plug portion from the socket portion.

A hammer may comprise a housing including an upper housing member and a lower housing member, the housing defining a chamber, the upper housing member having a first pressure source of pressurized hydraulic fluid or pressurized air, a piston reciprocating inside the chamber, the piston including at least a first surface which communicates with the first pressure source to move the piston in a first direction, a reciprocating work tool residing at least partially inside of the chamber, an upper part of the work tool being struck by the piston as the piston moves in the first direction inside the chamber to transfer force from the piston to a tip of the work tool, the tip being formed opposite the upper part and residing outside of the chamber, the upper part of the work tool being housed inside the lower housing member, a tool retention member removably attached to the lower housing member, wherein when the tool retention member is attached to the lower housing member the work tool cannot be removed from the chamber and when the tool retention member is removed from the lower housing member, the work tool may be removed from the chamber for replacement, and engaging structure associated with the upper housing member and the lower housing member and configured to permit the engagement and disengagement of the upper housing member with the lower housing member by relative rotation of the upper housing member and the lower housing member, the engaging structure including mutually engaging mating surfaces on the upper housing member and lower housing member.

BRIEF DESCRIPTION OF THE DRAWINGS

FIG. 1 is a perspective view of a hammer assembly according to one disclosed embodiment;

FIG. 2 is an exploded view of the hammer assembly of FIG. 1;

FIG. 3 shows a longitudinal section of a hammer assembly according to another disclosed embodiment;

FIG. 4 is a cross-sectional view on line IV-IV through the hammer assembly of FIG. 3;

FIG. 5 shows a longitudinal section of another hammer assembly according to yet another disclosed embodiment.

DETAILED DESCRIPTION

Figure 6:
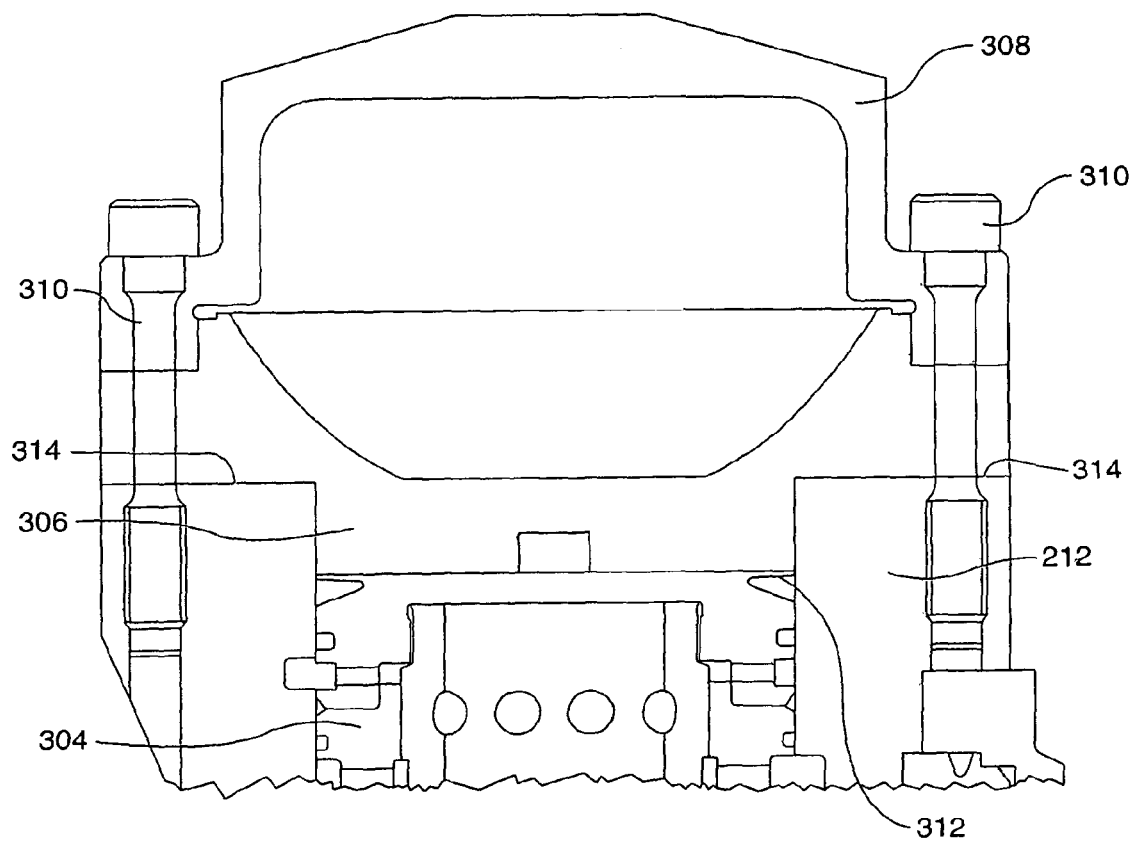
FIG. 6 is a enlarged view of part of the longitudinal section of FIG. 5.

With reference to FIGS. 1 and 2 there is shown a tool assembly 10, specifically a hydraulic hammer assembly, which may be attached to a backhoe or excavator (not shown). The tool assembly 10 includes a housing 11, a chamber 16 defined in the housing 11, a piston 18 and a work tool 20. The housing 11 is a two part housing including an upper housing member 12 and a lower housing member 14, which define an upper and lower chamber respectively, which together make up the chamber 16. The upper housing member 12 may be referred to as a cylinder, while the lower housing member 14 may be referred to as a front head. The piston 18 is operatively housed in the chamber 16 such that the piston 18 can translate in the general direction of arrows 22 and 24. In particular, during a work stroke, the piston 18 moves in the general direction of arrow 22 so as to strike the work tool 20, the upper part of which is housed in the chamber 16 of the front head 14. Conversely, during a return stroke, the piston 18 moves in the general direction of arrow 24.

The piston 18 includes a work portion 26 and a load portion 28. Pressurized fluid is advanced by a first hydraulic pressure source 30 against the work portion 26 to serve as a drive structure and urge the piston 18 towards the work tool 20 during the work stroke. Similarly, pressurized fluid is advanced by a second hydraulic pressure source 32 against the load portion 28 to serve as a return structure to return the piston 18 during the return stroke.

The hydraulic circuit is not described further, since it will be apparent to the skilled person that any suitable hydraulic arrangement may be used to provide pressurised fluid to the piston 18, such as the arrangement described in U.S. Pat. No. 5,944,120.

Near the end of the work stroke, the piston 18 strikes the work tool 20. The work tool 20 includes a tip 46. A tool retention member 80 retains the work tool 20 and limits the movement of the work tool 20 in the general direction of arrow 22. Removing the tool retention member 80 allows a variety of work tools 20 with different configurations of the tip 46 to be attached to the tool assembly 10. As the piston 18 strikes the work tool 20, the force of the piston 18 is transmitted through the work tool 20 to the tip 46 in the general direction of arrow 22. Moreover, this force is applied to a hard object such as rock, concrete, or asphalt in order to break up the hard object. The tool retention member does not form part of the present disclosure but is described in more detail in co-pending U.S. patent application Ser. No. 11/452,381, filed Jun. 15, 2006.

FIGS. 3 and 4 show a hammer assembly according to another embodiment. This differs from that shown in FIGS. 1 and 2 only in the tool retention member which is in the form of a retaining pin 148 which engages with a groove 150 in the tool 20.

With reference to the embodiments of FIGS. 1 to 4 the upper and lower housing members 12, 14 are connected by an engaging structure 50. In the illustrated embodiment the engagement structure 50 includes four lugs 52 provided equidistantly about the circumference of a plug portion 54 of the upper housing member 12. These are shaped such that as the plug portion 54 is inserted into a socket portion 56 of the lower housing member 14 the lugs 52 can pass between four projections 58 formed on the internal wall 60 of the socket portion 56. The upper housing member 12 is then rotated by 45 degrees relative to the lower housing member 14 so that the lugs 52 engage beneath the projections 58. It is to be understood that other forms of mutually engaging protrusions may be envisaged, and the shape and number of lugs and protrusions can be varied and are not limited to those shown in the figures. A stop (not illustrated) may be formed on the internal wall 60 of the socket portion such that upon rotation of the upper housing member 12 one of the lugs 52 comes into contact with the stop to indicate that sufficient rotation has taken place.

Prestressing structure in the form of four jacking screws 70 are provided to urge the upwardly facing mating surfaces 72 of the lugs 52 against the downwardly facing mating surfaces 74 of the projections 58. The screws 70 engage in threaded apertures 76 provided equidistantly around the perimeter of a circular flange 78 of the upper housing member 12. The jacking screws 70 engage with an upwardly facing bearing surface 79 formed on the upper end of the lower housing member 14.

Although embodiments have been described with reference to lugs and projections, it is to be understood that other forms of mutually engaging protrusions may be provided. For example the upwardly facing mating surface on the upper housing member may be provided on a helical protrusion which forms a male thread and engages with the downwardly facing mating surface of a corresponding helical protrusion on the lower housing member, serving as a female thread. In another example the engaging structure may be a bayonet coupling in which two or more pins are provided on the plug of the upper housing member, the pins engaging with two or more L-shaped slots provided on the internal surface of the socket.

Although an embodiment has been described in which the plug portion 54 is formed on the upper housing member 12 and the socket portion 56 is formed on the lower housing member 14, the engaging structure may be reversed, so that the plug portion is formed on the lower housing member 14 and the socket portion is formed on the upper housing member 12.

Although the prestressing structure described above comprises four jacking screws 70, the number, type and position of the jacking screws may be varied. Moreover other prestressing structure may be used, such as springs or other resilient elements which urge the upper and lower housing members apart. In the case of corresponding helical protrusions on the upper and lower housing members the prestressing structure may be the elastic or plastic deformation of the threads under a tightening torque on the housing members.

FIGS. 5 and 6 show a hammer assembly according to another embodiment. This differs from that shown in FIGS. 1 to 4 in that tension screws are used instead of compression jacking screws to impart the prestress. The tool assembly 210 includes a housing 211, a chamber 216 defined in the housing 211, a piston 218 and a work tool 220. The housing 211 is a two part housing including an upper housing member 212 and a lower housing member 214, which define an upper and lower chamber respectively, which together make up the chamber 216. The piston 218 is operatively housed in the chamber 216 such that the piston 218 can translate in the general direction of arrows 222 and 224. In particular, during a work stroke, the piston 218 moves in the general direction of arrow 222 so as to strike the work tool 220. Conversely, during a return stroke, the piston 218 moves in the general direction of arrow 224. The operation of the hydraulic circuit, piston 218, work tool 220 and tool retention member 280 is as described above with reference to FIGS. 1 and 2, and is not described further.

The upper and lower housing members 212, 214 are connected by an engaging structure 250. In the illustrated embodiment the engagement structure 250 includes four lugs 252 provided equidistantly about the circumference of a plug portion 254 of the upper housing member 212. These are shaped such that as the plug portion 254 is inserted into a socket portion 256 of the lower housing member 214 the lugs 252 can pass between four projections 258 formed on the internal wall 260 of the socket portion 256. The upper housing member 212 is then rotated relative to the lower housing member 214 so that the lugs 252 engage beneath the projections 258. It is to be understood that other forms of mutually engaging protrusions may be envisaged, and the shape and number of lugs and protrusions can be varied and are not limited to those shown in the figures. A stop (not illustrated) may be formed on the internal wall 260 of the socket portion such that upon rotation of the upper housing member 212 one of the lugs 252 comes into contact with the stop to indicate that sufficient rotation has taken place.

An annular bearing surface 300 is provided on the internal wall 260 of the socket portion 256. A piston sleeve 302 is provided around the piston and bears at one end against the bearing surface 300. The other end of the piston sleeve 302 bears against a valve sleeve 304 which is held against an accumulator housing 306. The accumulator housing 306 and its associated accumulator cover 308 are secured to an upper bearing surface 314 of the upper housing member 212 by tension screws 310. The valve sleeve 304 has a resilient deflector flange 312 which deflects to provide a biasing compression force when a torque is applied to the tension screws 310, as described below. The tension screws may be necked down, and may form part of a Bellville type interface.

INDUSTRIAL APPLICABILITY

The operation of the embodiment of the tool assembly shown in FIGS. 1 to 4 will be described. In use, the jacking screws 70 are tightened to a predetermined torque to prestress the engaging structure and establish a known contact stress between the upwardly facing mating surfaces 72 of the lugs 52 and the downwardly facing mating surfaces 74 of the projections 58.

In the embodiment shown in FIGS. 5 and 6, as the tension screws 310 are tightened the accumulator housing 306 contacts the resilient deflector flange 312 before it contacts the upper bearing surface 314 of the upper housing member 212. The flange 312 urges the valve sleeve 304 into compressive contact with the piston sleeve 302, which in turn bears against the annular bearing surface 300. As the tension in the screws 310 increases the compressive force applied from the accumulator housing 306 to the valve sleeve 304 increases, until the accumulator housing 306 contacts the upper bearing surface 314 of the upper housing member 212. At this point the resilient deflector flange 312 is fully deflected, and the lower housing member 214 is urged away from the upper housing member 212 by the liner stack, comprising the valve sleeve 304 and piston sleeve 302, thereby establishing a predetermined contact stress between the upwardly facing mating surfaces 272 of the lugs 252 and the downwardly facing mating surfaces 274 of the projections 258.

In at least some of the embodiments, under the cyclical action of the piston 18, 218 and tool 20, 220, which act to pull the upper 12, 212 and lower 14, 214 housing members apart, the contact stress varies cyclically, but remains in compression throughout the cycle, thereby reducing the risk of fatigue failure. In contrast the tie rods of the prior art hammer systems are subject to cyclical tensile stresses and have a much greater risk of fatigue failure.

The upper housing member 12, 212 is a precision component which contains the hydraulic components of the hammer system and requires substantial machining, while the lower housing member 14, 214 is a lower precision component which requires minimal manufacturing. By manufacturing the two housing members 12, 212, 14, 214 as separate components and joining them by the engaging structure 50, 250, the lower housing member can be made more economically and does not have to be manufactured to the high tolerances required by the upper housing member. The two housing members 12, 212, 14, 214 when joined, offer the advantages of a single housing 11, 211 in that the tool assembly 10, 210 is more compact than a tie rod structure and the housing 11, 211 can be cylindrical, allowing use of the tool assembly 10, 210 in narrow, confined locations such as between slabs, where the wider tie rod body would interfere with the slabs.

Although embodiments have been described with reference to a hammer assembly in which the drive means and return means are hydraulic pressure sources, the disclosed embodiments are applicable to any tool assembly having a piston movable within a chamber by suitable drive structure and return structure. The disclosed embodiments encompass pneumatic tools and other impact tools.

While the disclosed embodiments have been illustrated and described in detail in the drawings and foregoing description, such illustration and description is to be considered as exemplary and not restrictive in character, it being understood that exemplary embodiments have been shown and described and that all changes and modifications that come within the spirit of the disclosure are desired to be protected.

I claim:

1. A hammer comprising:
    a housing including an upper housing member and a lower housing member, the housing defining a chamber, the upper housing member having a first pressure source of pressurized hydraulic fluid or pressurized air;
    a piston reciprocating inside the chamber, the piston including at least a first surface which communicates with the first pressure source to move the piston in a first direction;
    a reciprocating work tool residing at least partially inside of the chamber, an upper part of the work tool being struck by the piston as the piston moves in the first direction inside the chamber to transfer force from the piston to a tip of the work tool, the tip being formed opposite the upper part and residing outside of the chamber, the upper part of the work tool being housed inside the lower housing member;

a tool retention member removably attached to the lower housing member, wherein when the tool retention member is attached to the lower housing member the work tool cannot be removed from the chamber and when the tool retention member is removed from the lower housing member, the work tool may be removed from the chamber for replacement;

a socket portion formed on one of the upper housing member or the lower housing member, a plug portion formed on the other of the upper housing member or the lower housing member, the plug portion positioned in the socket portion, a plurality of outwardly projecting lugs formed on the plug portion and a plurality of inwardly projecting projections formed on the socket portion, the lugs being passable between the projections when the upper housing member is attached to the lower housing portion by inserting the plug portion into the socket portion, then rotatable relative to the projections to engage the lugs beneath the projections and prevent removal of the plug portion from the socket portion; and a prestressing structure configured to urge surfaces on the lugs and the projections into compressive engagement with one another, the prestressing structure including at least one jacking screw positioned between the upper housing member and the lower housing member.

2. The hammer according to claim 1, wherein the at least one jacking screw comprises a plurality of jacking screws.

3. The hammer according to claim 2, wherein the jacking screws are about equally spaced from one another around a perimeter of the upper housing member.

4. The hammer according to claim 3, wherein the plurality of jacking screws comprises four jacking screws.

5. The hammer according to claim 1, wherein the at least one jacking screw is disposed in a threaded aperture formed in the upper housing member.

6. The hammer according to claim 1, wherein the at least one jacking screw comprises a plurality of jacking screws, and the jacking screws are provided in apertures disposed about equidistant around a perimeter of a flange of the upper housing member.

7. The hammer according to claim 6, wherein the jacking screws engage a face of the lower housing member.

8. A hammer comprising:
a housing including an upper housing member and a lower housing member, the housing defining a chamber, the upper housing member having a first pressure source of pressurized hydraulic fluid or pressurized air;

a piston reciprocating inside the chamber, the piston including at least a first surface which communicates with the first pressure source to move the piston in a first direction;

a reciprocating work tool residing at least partially inside of the chamber, an upper part of the work tool being struck by the piston as the piston moves in the first direction inside the chamber to transfer force from the piston to a tip of the work tool, the tip being formed opposite the upper part and residing outside of the chamber, the upper part of the work tool being housed inside the lower housing member;

a tool retention member removably attached to the lower housing member, wherein when the tool retention member is attached to the lower housing member the work tool cannot be removed from the chamber and when the tool retention member is removed from the lower housing member, the work tool may be removed from the chamber for replacement;

an engaging structure associated with the upper housing member and the lower housing member and configured to permit the engagement and disengagement of the upper housing member with the lower housing member by relative rotation of the upper housing member and the lower housing member, the engaging structure including mutually engaging mating surfaces on the upper housing member and lower housing member; and a prestressing structure configured to urge the lower housing member in the first direction away from the upper housing member, the prestressing structure including at least one jacking screw positioned between the upper housing member and the lower housing member.

9. The hammer according to claim 8, wherein the at least one jacking screw comprises a plurality of jacking screws.

10. The hammer according to claim 9, wherein the jacking screws are about equally spaced from one another around a perimeter of the upper housing member.

11. The hammer according to claim 8, wherein the at least one jacking screw is disposed in a threaded aperture formed in the upper housing member.

12. The hammer according to claim 8, wherein the at least one jacking screw comprises a plurality of jacking screws, and the jacking screws are provided in apertures disposed about equidistant around a perimeter of a flange of the upper housing member.

13. The hammer according to claim 12, wherein the jacking screws engage a face of the lower housing member.

14. A hammer comprising:
a housing including an upper housing member and a lower housing member, the housing defining a chamber, the upper housing member having a first pressure source of pressurized hydraulic fluid or pressurized air;

a piston reciprocating inside the chamber, the piston including at least a first surface which communicates with the first pressure source to move the piston in a first direction;

a reciprocating work tool residing at least partially inside of the chamber, an upper part of the work tool being struck by the piston as the piston moves in the first direction inside the chamber to transfer force from the piston to a tip of the work tool, the tip being formed opposite the upper part and residing outside of the chamber, the upper part of the work tool being housed inside the lower housing member;

an engaging structure associated with the upper housing member and the lower housing member and configured to permit the engagement and disengagement of the upper housing member with the lower housing member by relative rotation of the upper housing member and the lower housing member, the engaging structure including mutually engaging mating surfaces on the upper housing member and lower housing member; and a prestressing structure configured to urge the lower housing member in the first direction away from the upper housing member, the prestressing structure including at least one jacking screw positioned between the upper housing member and the lower housing member.

15. The hammer according to claim 14, wherein the at least one jacking screw comprises a plurality of jacking screws.

16. The hammer according to claim 15, wherein the jacking screws are about equally spaced from one another around a perimeter of the upper housing member.

17. The hammer according to claim 16, wherein the plurality of jacking screws comprises four jacking screws.

18. The hammer according to claim 14, wherein the at least one jacking screw is disposed in a threaded aperture formed in the upper housing member.

19. The hammer according to claim 14, wherein the at least one jacking screw comprises a plurality of jacking screws, and the jacking screws are provided in apertures disposed about equidistant around a perimeter of a flange of the upper housing member.

20. The hammer according to claim 19, wherein the jacking screws engage a face of the lower housing member.

* * * * *